United States Patent [19]

Tanaka

[11] 4,342,139
[45] Aug. 3, 1982

[54] ONE-PIECE QUICK RELEASE CLIP

[75] Inventor: Toshie Tanaka, Machida, Japan

[73] Assignee: Nifco Inc., Yokohama, Japan

[21] Appl. No.: 174,394

[22] Filed: Jul. 31, 1980

[51] Int. Cl.³ ............................................. F16B 19/00
[52] U.S. Cl. .................... 24/292; 24/221 R; 24/297; 52/518
[58] Field of Search ................. 24/211 R, 211 P, 212, 24/221 R, 291, 292, 289, 297; 411/84, 85, 121, 125, 127, 182; 52/517, 518

[56] References Cited

U.S. PATENT DOCUMENTS

| | | | |
|---|---|---|---|
| 2,745,156 | 5/1956 | Bedford | 24/291 |
| 2,762,398 | 9/1956 | Adam | 24/291 X |
| 2,859,710 | 11/1958 | Elsner | 24/221 R X |
| 2,894,301 | 7/1959 | Scott | 24/291 |
| 4,178,656 | 12/1979 | MacFarlane | 24/221 R |
| 4,247,219 | 1/1981 | Ausprung | 24/221 R X |
| 4,262,394 | 4/1981 | Wright | 24/221 R X |

FOREIGN PATENT DOCUMENTS

| | | | |
|---|---|---|---|
| 700506 | 12/1964 | Canada | 24/292 |
| 1215106 | 7/1956 | France | 24/211 R |
| 1219007 | 1/1971 | United Kingdom | 24/221 R |

Primary Examiner—Thomas J. Holko
Attorney, Agent, or Firm—Jerold M. Forsberg; Thomas W. Buckman; Jack R. Halvorsen

[57] ABSTRACT

A plastic clip comprises an insertion piece adapted to be inserted into the groove of an object having a section of the shape of the letter "C" from one end thereof, a neck portion projecting from the center of one surface of the insertion piece and adapted to pass along the slit communicating with the groove of the object, and an oblong head piece formed at the leading end of the neck portion. The insertion piece of the clip is provided with four flexible wings projecting outwardly from the four positions on the outer boundary of the central piece. With this clip, the object is fixed on a given panel by causing the central portion of the insertion piece to be slid into the groove of the object, then allowing the oblong head piece of the clip to be passed through a matched oblong hole bored in advance in the panel and finally turning the protruding oblong head piece by 90°, and the removal of the object from the panel is effected by turning the oblong head piece by another 90°.

7 Claims, 9 Drawing Figures

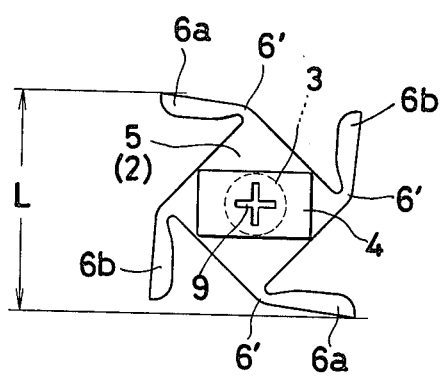
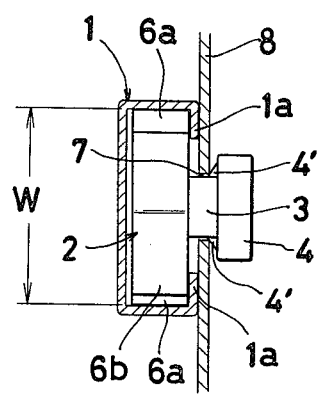
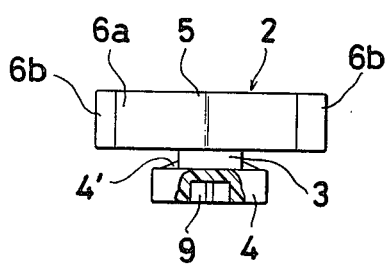
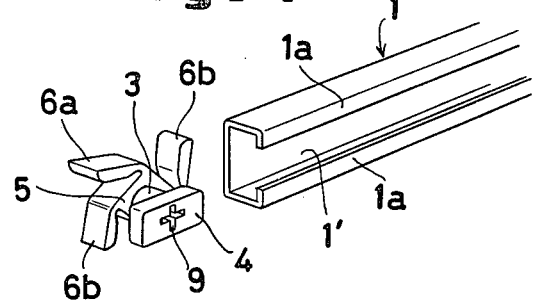
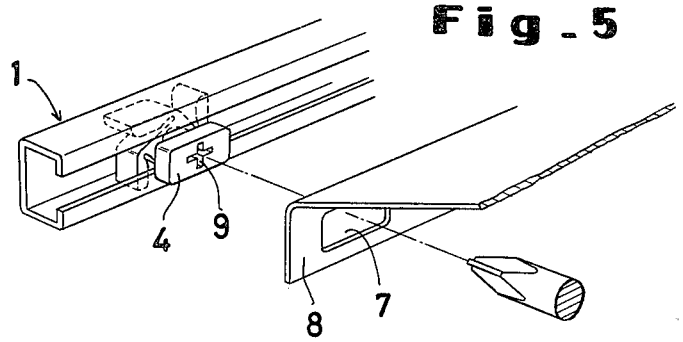

Fig_6
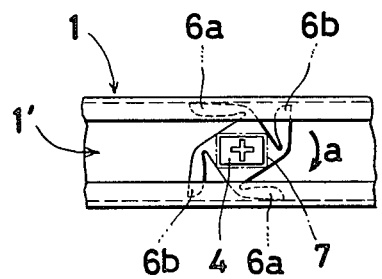
Fig_7
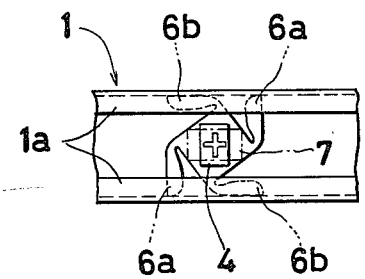
Fig_8
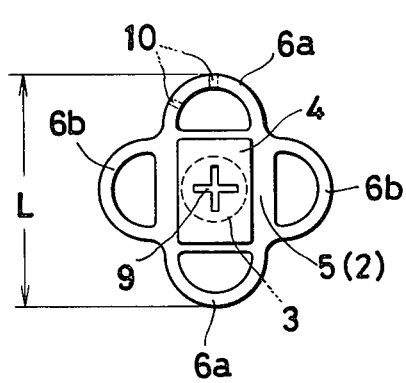
Fig_9
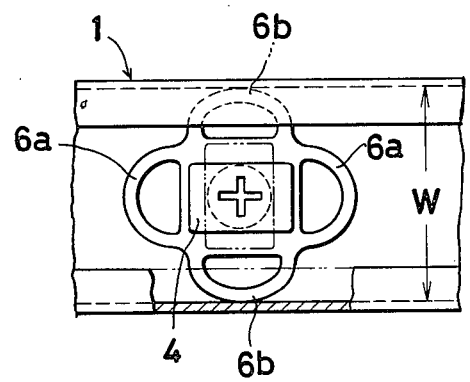

4,342,139

ONE-PIECE QUICK RELEASE CLIP

BACKGROUND OF THE INVENTION

This invention relates to a plastic clip for fixing a plate juxtaposed an object possessing a cross-section of the shape of the letter "C".

In the automobile industry, for example, various types of clips have been used for fixing decorative moldings which have C-shaped cross-sections on the outer surfaces of automobile bodies. Such conventional clips have a general construction such that once they are used to fix a molding on an automobile body, they can be removed only with great difficulty. If they are forcibly removed there will frequently be damage to the object fixed by the clip and to the automobile body. Time labor will then have to be spent for the repair of the damage done to the automobile body and the replacement of the damaged or broken objects with new ones.

SUMMARY OF THE INVENTION

This invention has been accomplished with a view to overcoming the inconveniences suffered as described above. One object of this invention is to provide a plastic clip capable of fixing on a plate or support an object possessing a cross-section of the shape of the letter "C" and further capable of enabling the object to hold fast on the plate and yet be readily removable from the plate.

To accomplish the object described above according to this invention, there is provided a clip for fixing an object having a cross-section of the shape of the letter "C" (hereinafter referred to briefly as a "C-section object"), which clip comprises an insertion piece having flexible wings projecting in four equiangular directions, a neck portion projecting from the center of the insertion piece perpendicularly thereto and an oblong head piece formed at the leading end of the neck portion. With this clip, a given C-section object can be fixed to a given panel by pushing the insertion piece into the substantially confined space of the C-section object from one end, pushing the head portion through a matched hole formed in advance at a prescribed position in the panel, and rotating the head portion through an angle of 90°. The C-section object can be removed from the panel through again rotating the head portion by an angle of 90° and pulling the head portion out of the hole.

The other objects and characteristics of the present invention will become apparent from the further disclosure of the invention to be made hereinafter with reference to the accompanying drawing.

BRIEF DESCRIPTION OF THE DRAWING

FIG. 1 is a rear view of one embodiment of the clip of this invention for fixing a C-section object.

FIG. 2 is a plan view of the clip of FIG. 1.

FIG. 3 is a sectioned view of the clip of FIG. 1 in the state of retaining a C-section object fast on a panel.

FIG. 4 is an explanatory diagram for illustrating the manner in which the clip of FIG. 1 is slid into the groove of the C-section object.

FIG. 5 is an explanatory diagram for illustrating the manner in which the clip of FIG. 1 held inside the C-section object is attached to the panel.

FIG. 6 is a rear view of the clip of FIG. 1 after having been inserted into the C-section object.

FIG. 7 is a rear view of the clip of FIG. 1 in the state assumed after the clip has been rotated by an angle of 90° from the position shown in FIG. 6.

FIG. 8 is a rear view of another embodiment of the clip of this invention for fixing a C-section object.

FIG. 9 is a rear view of the clip of FIG. 8 in the state assumed after the clip has been slid into the groove of the C-section object and then rotated by an angle of 90°.

DESCRIPTION OF THE PREFERRED EMBODIMENT

The first embodiment of the clip of this invention will be described with reference to FIGS. 1-7. The clip of the present invention integrally comprises an insertion piece 2 adapted to be slid into the groove of a molding 1 (a C-section object) from one end, a neck portion 3 projecting from the center of one surface of the insertion piece 2 having a thickness which permits it to enter and slide along the slit 1' of the C-section object, and an oblong head piece 4 formed at the leading end of the neck portion 3 and having a rectangular or elliptic shape. This clip is molded of a plastic material possessing a suitable degree of resiliency. The insertion piece 2 consists of a central portion 5 and two pairs of opposed flexible wings 6a, 6b projecting outwardly from the four equally separated positions around the central portion 5 serving to limit the rotation of the insertion piece 2 within the inner space of the molding 1 to one quarter of a complete rotation.

In the illustrated embodiment, the central portion 5 of the insertion piece 2 has the shape of a square and the flexible wings 6a, 6b project from the corners of the square outwardly at an acute angle relative to the respective adjacent sides of the square. All of the flexible wings 6a, 6b project in the same rotational direction thereby permitting rotation of the insertion piece 2 in one direction. The wings are each provided at their base portions with a constricted flexible portion 6'. The shape of the central portion 5 need not be limited to a square. It may be a circle, for example.

The perpendicular distance L between the free ends of each pair of flexible wings is slightly greater than the width W of the groove of the molding 1. When two opposed flexible wings of either pair of wings 6a, 6b are bent toward the central portion at their respective constricted flexible portions 6' and the neck portion 3 is aligned with the slit 1' (FIG. 4), the insertion piece 2 can be pushed into the molding 1 from one end thereof. Once the insertion piece 2 enters the groove of the molding 1, the downwardly bent free ends of the pair of flexible wings flex outwardly of the central portion 5 and come into tight engagement, owing to the resiliency of the material, with the inner lateral edges of the molding to keep the insertion piece 2 fast within the molding. The uniform length of the flexible wings is predetermined so that when the insertion piece is kept fast inside the molding, the free ends of the remaining pair of flexible wings fall at a distance from the inner lateral edges of the molding (FIG. 6).

Further, in the present embodiment, when the insertion piece 2 held fast inside the molding is forced to turn in the same direction in which the wings 6a, 6b extend, for example, this forced rotation is precluded because the free ends of the other pair of flexible wings which are not flexed into engagement with the inner lateral edges of the molding engage the inner lateral edges of the molding and acts as stops. As is readily apparent in the drawings, the free ends of the wings are curved on one side thereof so that as they encounter the inner lateral edges of the molding they will be deflected outwardly of said central portion 5 to act as said stops. When force is applied to rotate the insertion piece 2 in the opposite direction in which the wings 6a, 6b extend as indicated by the arrow "a" in FIG. 6 rotation of the insertion piece 2 will be obtained in increments of one quarter of a complete rotation. When the insertion piece 2 makes this one-quarter rotation, the other pair of flexible wings are bent downwardly by the inner lateral edges of the molding and, at the same time, the oblong head piece 4 formed at the leading end of the neck portion 3 changes its direction by 90° (FIG. 7).

To fix a molding on an automobile body, oblong holes 7 of a shape conforming to the shape of the oblong head piece 4 are bored at fixed intervals in the outer panel 8 of the automobile body along the line on which the molding is desired to be fixed. As many clips as there are oblong holes are slid into the groove of the molding and separated from each other by intervals identical with those of the oblong holes, and then the oblong head pieces 4 are turned and set in the same direction as the corresponding oblong holes 7. Subsequently, the oblong head pieces 4 of the clips are passed through the corresponding oblong holes 7 until they protrude from the rear side of the oblong holes, and the clips are turned, clockwise for example, by one quarter of a complete rotation from behind the outer panel 8 of the automobile body by the engagement of a tool with the oblong head pieces. The direction of the oblong head pieces 4, therefore, is changed from the direction of the oblong holes 7 to a position at right angles to the oblong holes, with the result that the rear side strips 1a opposed to each other across the slit 1' of the molding and the outer panel 8 are maintained juxtaposed to each other by the interaction of the clips and the holes.

In this case, the opposite longitudinal ends of each oblong head piece 4 are provided on the side against the rear side of the outer panel 8 with surfaces 4' inclined downwardly from the neck portion 3 toward the opposite ends as illustrated in FIGS. 2 and 3. When the oblong head piece 4 is thrust out of the rear side of the oblong hole 7 and then turned by one quarter of a complete rotation, the aforementioned inclined surfaces 4' come into contact with the rear side of the outer panel 8 and serve to draw the insertion piece and molding gradually toward the outer panel and, consequently, increase the squeezing force exerted on the outer panel.

The molding which has been fixed on the surface of the outer panel of the automobile body, as described above, can easily be removed by turning the oblong head pieces 4 by another quarter of a complete rotation from the rear side of the outer panel thereby bringing the direction of the oblong head pieces 4 into agreement with that of the oblong holes 7 in the outer panel.

This one-quarter rotation of the oblong head piece 4 on the rear side of the outer panel can be affected by means of a wrench or some other suitable pinching tool applied to the oblong head piece. In the present embodiment, the oblong head piece is provided at the center thereof with an engaging recess 9 capable of admitting the tip of a screw driver, so that the rotation of the oblong head piece is accomplished by use of a screw driver.

In the embodiment so far described, the clip can be turned in only one fixed direction. In the second embodiment illustrated in FIGS. 8–9, the clip is so constructed that it can be turned in either direction. Specifically, the insertion piece 2 is formed of a central portion 5 in the shape of a square and four arched flexible wings, designated in pairs 6a, 6b. The arched wings are joined at the opposite terminals thereof to the central portion and projected perpendicularly relative to the sides of the square. The arched flexible wings 6a, 6b are paired by their positional opposition. The distance L between the apexes of the flexible wings in each pair is slightly greater than the width W of the groove of the molding.

By slightly bending inwardly the apexes of the pair of opposed flexible wings, the clip can be pushed into the molding 1 and retained fast at a prescribed position inside the molding. The insertion piece 2 can be turned clockwise or counterclockwise, whichever is convenient, so that the direction of the oblong head piece 4 may be turned and retained at 90° increments. By use of clips of such construction, as described above, the molding 1 can be fixed on the surface of the outer panel 8 or removed therefrom, similarly to the first embodiment. Optionally, these flexible wings may be provided with free ends by insertion of separating portions 10 at apexes and other suitable position. These free ends serve to enhance the flexibility of the wings and permit the insertion piece to be rotatable in either direction.

As is clear from the description given above, a molding can be fixed on a panel by having insertion pieces of as many clips as necessary inserted into the groove of the molding from one end thereof, allowing the oblong head pieces of the clips to be passed through the corresponding oblong holes formed in the panel and finally turning the oblong head pieces by 90°. After this fixing, the molding can easily be removed from the panel by turning the oblong head pieces by another 90° thereby allowing them to be pulled out of the oblong holes of the panel. The clip of the present invention, therefore, permits an object such as the molding on an automobile body which has a cross-section of the shape of the letter "C" to be readily fixed on the automobile body and then removed therefrom.

From the foregoing description, those skilled in the art will readily understand the construction, operation and advantages of the invention and realize that there are modifications and variations which do not depart from the spirit of the invention that are contemplated by and are within the scope of the appended claims.

What is claimed is:

1. A one-piece plastic clip, adapted for fixing an object having a partially confined groove therein and a slot in communication therewith and being substantially C-shaped in cross-section to a panel having an aperture therein of a predetermined shape, comprising:

an insertion piece adapted to be inserted into the groove of said C-shaped object from one end thereof, said insertion piece including a central portion and four flexible wings projecting outwardly from four positions equidistantly spaced on the outer boundary of the central portion, said flexible wings being arranged in pairs and each pair being separated by a distance greater than the width of the groove of the C-shaped object, a neck portion projecting from the center of one surface of said insertion piece and adapted to extend through and pass along the slot communicating with the groove of the C-shaped object, and an oblong head piece formed at the leading end of said neck portion, substantially conforming to the shape of said aperture in said panel, whereby when said insertion piece is inserted in said groove and said oblong head piece is aligned and passed through said aperture the C-shaped object and the panel may be fixedly secured relative to one another by rotation of the clip to a position where the oblong head piece is no longer in alignment with said aperture and whereby said position is defined by said wings coacting with said groove in said C-shaped object.

2. The plastic clip according to claim 1, wherein said flexible wings each have one terminal end thereof connected to the central portion and the other terminal end thereof left as a free end.

3. The plastic clip according to claim 2, wherein said terminal end of each of said wings connected to said central portion is of a reduced thickness.

4. The plastic clip according to claim 2, wherein said free end of each of said flexible wings is curved on one side thereof to cause said wing to be deflected outwardly away from said central portion.

5. The plastic clip according to claim 1, wherein each of said flexible wings have opposite terminal ends connected to the central portion.

6. The plastic clip according to claim 1, wherein said oblong head piece has an exposed face having means therein for receiving the end of a tool adapted to impart a rotative force thereto.

7. The plastic clip according to claim 1, wherein said oblong head piece includes means for drawing said insertion piece closer to said panel as said clip is rotated to a position where said oblong head piece is out of alignment with said aperture.

* * * * *